Patented Sept. 19, 1922.

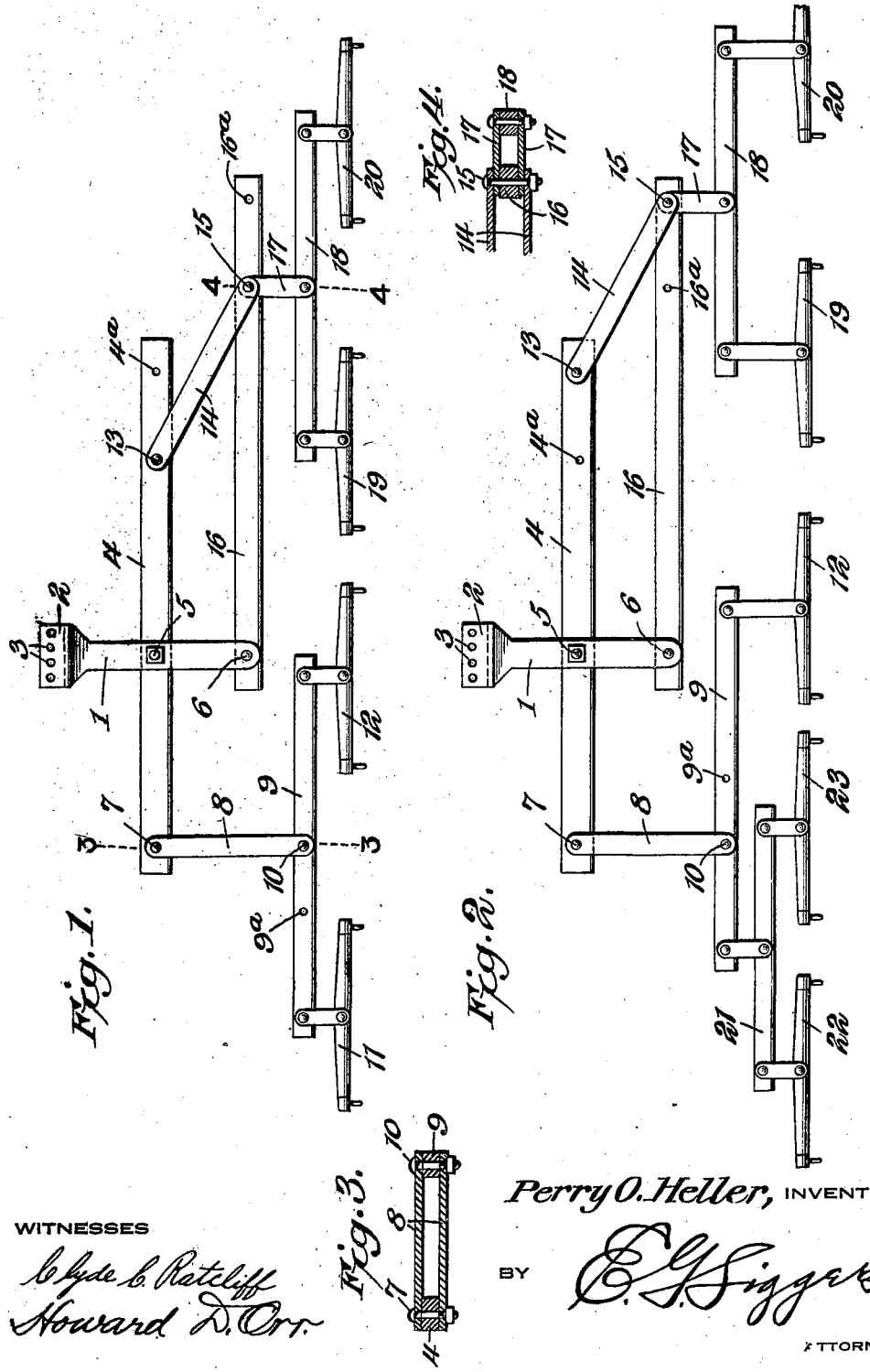

UNITED STATES PATENT OFFICE.

PERRY OSCAR HELLER, OF PROPHETSTOWN, ILLINOIS.

DRAFT EQUALIZER.

Application filed May 26, 1921. Serial No. 472,786.

*To all whom it may concern:*

Be it known that I, PERRY O. HELLER, a citizen of the United States, residing at Prophetstown, in the county of Whiteside and State of Illinois, have invented a new and useful Draft Equalizer, of which the following is a specification.

This invention relates to draft equalizers.

The object is to provide a four horse evener for use principally in connection with plows, whereby one animal may travel in the last furrow made while the remaining three tread upon unplowed ground, the main evener bar being of minimum length and so located as to allow the draw bar, to which it is fulcrumed, to be attached to the said plow in such manner as to position the plow in proper relation to the last furrow.

Another object is to provide a four horse evener of this character which may be readily converted into a five horse evener by the simple adjustment of said spreader beam and the addition of another double tree and single tree, said change and addition being easily and quickly accomplished with a minimum amount of work, the entire device being simple of construction and easily hitched and capable of being manufactured and sold at a low cost.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified so long as such changes or modifications mark no material departure from the salient features of the invention, as specifically pointed out in the appended claim.

In the drawing, in which similar reference characters designate corresponding parts throughout the several figures:—

Figure 1 is a plan view of the equalizer adjusted for four horses;

Figure 2 is a similar view of the same adjusted for five horses;

Figure 3 is a section on the line 3—3, Fig. 1;

Figure 4 is a section on the line 4—4, Fig. 1.

A draw bar 1 is provided which is formed of suitable material and comprises an elongated bar adapted to be arranged longitudinally of the line of draft or in alinement with the beam of a plow or other implement (not shown). This draw bar 1 may be in the form of a single bar, or it may comprise a pair of bars arranged one above the other, and carries at its rear or inner end an attaching plate or clevis 2 provided with a series of apertures 3 for the attachment of the device to the beam of the implement, as will be clearly understood, it being preferable to attach the same by means of two bolts to the end of the beam, so that the draw bar may be rigidly secured thereto.

At a point substantially midway of the length of the draw bar, a main evener beam 4 is fulcrumed by means of a bolt 5, the said evener beam being either arranged beneath the draw bar in the event the same is composed of only one member, or between the spaced upper and lower members thereof, in the event the same is of the double formation.

The pivotal bolt 5 is arranged considerably to one side of the center of the evener beam 4 which provides for a greater extension of the same in a direction away from the last furrow formed than upon the side adjacent to said furrow, and the draw bar extends forwardly in advance of the pivotal bolt 5 where it is provided with a suitable aperture for the bolt 6 arranged in longitudinal alinement with the bolt 5 for a purpose to be explained.

The main evener beam 4 is adapted to freely swing about its fulcrum bolt 5, and the shorter end thereof, or the end adjacent to the said last furrow, is provided with a suitable aperture adjacent to its terminal for the reception of a vertically disposed bolt 7 to which is pivoted upper and lower spaced links 8 arranged upon the upper and lower sides of the evener beam 4 and extending forwardly in substantially parallel relation to the forward extension of the draw bar and somewhat beyond the front terminal thereof, where they are adapted to receive between their terminals a double tree 9, pivoted upon the bolt 10.

The double tree 9 is equipped at each end with an ordinary single tree, the single tree 11 at the outer end, or that farthest removed from the draw bar 1 being adapted to lie immediately over the last furrow made, while the single tree 12, carried by the other or inner end of the doubletree 9, is substantially in front of the draw bar and in position to allow the animal hitched thereto to travel upon the unplowed ground adjacent to the furrow, the attached plow (not shown) being in proper position to turn the soil immediately in rear of such animal and to throw the same into the last furrow, in the usual manner.

In the arrangement described, the ends of the doubletree 9 are equal in length, that is to say, the pivotal bolt 10 traverses an aperture in the same located at the center thereof, and an additional aperture 9$^a$ is provided at a point between the bolt 10 and the outer end thereof, for a purpose to be explained.

The main evener beam 4, at its opposite or longer end, is provided with a pair of spaced apertures 4$^a$, the innermost one of which, in the arrangement shown in Fig. 1, receives a bolt 13, upon which are fulcrumed a pair of links 14 which, together with their links 8, may be formed of ordinary strap iron of the desired length.

The links 14 are adapted to extend forwardly and outwardly, at an angle, and have their outer ends apertured for the reception of a bolt 15, which is in alinement with the bolt 6, transversely of the line of draft, and the bolts 6 and 15 are adapted to traverse apertures in a spreader bar 16, which is thus held in substantially parallel relation to the main evener beam 4, and which extends outwardly beyond the bolt 15, the latter traversing, in the present arrangement, the innermost of a pair of apertures 16$^a$, formed in the outer portion of the spreader bar.

By reason of its connection to the rigid forward extension of the draw bar 1, and the fact that the spreader bar 16 is thus held in parallel relation to the evener 4, it will be seen that the links 14 cannot swing about the bolts 13 or 15. The bolt 15 is also adapted to connect to the spreader bar the rear ends of metallic links 17, which are somewhat shorter than the aforesaid links 8 and have pivotally mounted between their forward ends a doubletree 18 carrying at its ends single trees 19 and 20, respectively.

With the links 14 arranged as described, the active leverage or pull of the team of horses attached to the single trees 19 and 20, is substantially equal to that of the other team hitched to the single trees 11 and 12, and allows of the outermost animal passing along the last furrow and the plow to assume the proper position with relation to the latter, the remaining three animals having the unplowed ground beneath them. In other words, with this arrangement, there is one horse immediately in front of the plow, with one to one side and two to the other, and yet the draft of each is equalized and the plow drawn evenly through the ground.

When it is desired to adjust the device for use in connection with five animals, the rear ends of the links 14 are connected by the bolt 13 to the outermost aperture 4$^a$ of the evener beam 4 thus materially increasing the leverage of the same. The forward ends of the links 14 are then connected by the bolt 15 to the outermost aperture 16$^a$ of the spreader bar 16, and the links 17 likewise shifted, which removes the doubletree 18 and attached single trees 19 and 20, farther away from the line of draft of the draw bar 1, and provides room for an additional animal to be placed. In addition to this, the bolt 10 connecting the links 8 to the doubletree 9, is shifted from the innermost to the outermost of a pair of apertures 9$^a$ formed therein for the purpose, thus increasing the leverage of the inner end of the doubletree 9, which thus becomes an evener bar, the single tree 12 remaining in position at the inner, longer end thereof, while the outer single tree 11 is removed, a double tree 21, carrying the outer and inner single trees 22 and 23, respectively, is then attached in place of the single tree 11.

With this latter arrangement, five animals are hitched to the plow substantially abreast, with that animal connected to the single tree 22 walking in the last furrow, the remaining four being upon the unplowed ground. The team of animals hitched to the single trees 19 and 20 exert increased pull on the evener beam 4 by reason of the change in position of the bolt 13, and the draft of the same is substantially equal to that of the remaining three animals connected to the single trees 12, 22 and 23.

Likewise the draft exerted upon the single tree 12 is equalized to that of the single trees 22 and 23, through the aforesaid change in the location of the bolt 10.

From the foregoing it will be seen that a simple, easily attached and cheaply manufactured draft equalizer has been provided which may be readily converted from a four to a five horse equalizer and which permits in either arrangement of one animal walking in the last furrow while the remaining animals walk upon unplowed ground, and that the plow is always in a position to turn the ground in the proper line adjacent to said furrow, the provision of the plurality of apertures 3 in the connecting plate or clevis of the draw bar facilitating such alinement, for by adjusting the bolts connecting the same to the front end of the plow beam, the plow beam may be shifted slightly with relation to the line of draft, as will be clearly understood.

What is claimed is:

In a draft equalizer, the combination of a longitudinally-disposed draw bar, a transverse evener beam pivoted midway of the length of the draw bar and at one side of the longitudinal center of said beam, a spreader bar arranged in advance of the evener beam and pivoted at its inner end to the forward end of the draw bar, a pair of links pivotally connected to the short end of the evener beam, a doubletree pivotally connected to the forward end of the said links and carrying singletrees, another pair of links pivotally connected to the long end of the evener beam and the outer end of the spreader bar, said evener beam and spreader bar having additional apertures at their outer ends whereby the position of the last-mentioned links may be shifted, said links assuming an inclined position in both of their adjusted positions, and another double tree flexibly connected to the outer end of the spreader bar and carrying singletrees.

In testimony, that I claim the foregoing as my own, I have hereto affixed my signature.

PERRY OSCAR HELLER.